(12) United States Patent
Cleodolphi

(10) Patent No.: US 7,401,455 B1
(45) Date of Patent: Jul. 22, 2008

(54) SYSTEM AND METHOD FOR CONTROLLING THE BASE CUTTER HEIGHT OF A SUGAR CANE HARVESTER

(75) Inventor: Daenio Cleodolphi, Piracicaba (BR)

(73) Assignee: CNH America LLC, New Holland, PA (US)

( * ) Notice: Subject to any disclaimer, the term of this patent is extended or adjusted under 35 U.S.C. 154(b) by 23 days.

(21) Appl. No.: 11/649,068

(22) Filed: Jan. 3, 2007

(51) Int. Cl.
*A01D 41/14* (2006.01)
*A01D 46/08* (2006.01)
*A01D 75/28* (2006.01)

(52) U.S. Cl. .................................... 56/10.2 E
(58) Field of Classification Search ............... 56/10.2 E, 56/208, 102 R, 10.4, 10.2 A; 460/1
See application file for complete search history.

(56) References Cited

U.S. PATENT DOCUMENTS

| | | | |
|---|---|---|---|
| 2,748,552 A | 6/1956 | Pool et al. ..................... 56/15 |
| 2,788,629 A | 4/1957 | Becker ........................ 56/157 |
| 3,548,570 A | 12/1970 | Knott et al. ................... 56/15 |
| 3,945,138 A | 3/1976 | Heusler et al. ................ 37/190 |
| 4,270,337 A | 6/1981 | Pinto .......................... 56/13.9 |
| 4,332,126 A * | 6/1982 | Van Auwelaer et al. .. 56/10.2 R |
| 4,414,792 A * | 11/1983 | Bettencourt et al. ....... 56/10.2 E |
| 4,437,295 A * | 3/1984 | Rock ....................... 56/10.2 E |
| 4,470,635 A | 9/1984 | Paurat et al. ................... 299/1 |
| 4,594,840 A * | 6/1986 | D'Almeida et al. .......... 56/11.2 |
| 4,641,490 A * | 2/1987 | Wynn et al. ............... 56/10.2 E |
| 4,660,649 A | 4/1987 | Anderson et al. ............. 172/2 |
| 5,138,819 A * | 8/1992 | Andre ..................... 56/10.2 R |
| 5,199,248 A | 4/1993 | Hale et al. ..................... 56/102 |
| 5,359,836 A * | 11/1994 | Zeuner et al. ............. 56/10.2 E |
| 5,471,825 A * | 12/1995 | Panoushek et al. ........ 56/10.2 E |
| 5,473,870 A * | 12/1995 | Panoushek et al. ........ 56/10.2 E |
| 5,666,793 A * | 9/1997 | Bottinger ................ 56/10.2 R |
| 5,704,200 A * | 1/1998 | Chmielewski et al. .... 56/10.2 E |
| 5,713,190 A * | 2/1998 | Vermeulen et al. ........ 56/10.2 E |
| 5,937,621 A * | 8/1999 | Eggenhaus ............... 56/10.2 E |
| 5,961,573 A * | 10/1999 | Hale et al. ................... 701/214 |

(Continued)

FOREIGN PATENT DOCUMENTS

BR 0301203 4/2003

(Continued)

*Primary Examiner*—Árpád Fábián-Kovács
(74) *Attorney, Agent, or Firm*—Michael C. Harms; John William Stader; Patrick M. Sheldrake

(57) ABSTRACT

A system, and the method of operation and use thereof, for controlling and adjusting the height of a base cutter of a sugar cane harvester, during a harvesting operation, and without the necessity for continuous user intervention and adjustment, to maintain the height of the cut at approximately a desired height, including a control system that has a processor unit which is operable under program control during a harvesting operation, following initiation of program operation by a machine operator, to simultaneously monitor both the detected base cutter height and the detected cutting resistance encountered by the harvester as it traverses a particular ground track, and, based upon such detected conditions, to automatedly control the adjustment of the height of the harvester chassis above the ground surface so that the cutting apparatus of the base cutter unit is continuously adjusted to cut at approximately the desired cutting height, within an acceptable vertical movement range or bandwidth, during the course of the harvesting cut operation.

21 Claims, 10 Drawing Sheets

U.S. PATENT DOCUMENTS

| | | | |
|---|---|---|---|
| 6,272,819 B1 | 8/2001 | Wendte et al. | 56/11.9 |
| 6,381,937 B1 * | 5/2002 | Nelson | 56/33 |
| 6,568,161 B1 | 5/2003 | Paquet et al. | 56/10.2 E |
| 6,588,187 B2 * | 7/2003 | Engelstad et al. | 56/10.2 E |
| 6,758,029 B2 * | 7/2004 | Beaujot | 56/10.2 E |
| 6,789,379 B2 | 9/2004 | Heidjann et al. | 56/10.2 |
| 6,791,488 B2 | 9/2004 | Diekhans et al. | 342/22 |
| 6,871,483 B1 * | 3/2005 | Panoushek | 56/10.2 E |
| 6,883,299 B1 * | 4/2005 | Gramm | 56/10.2 E |
| 2003/0000193 A1 * | 1/2003 | Beck et al. | 56/10.2 E |
| 2003/0089093 A1 * | 5/2003 | Paquet et al. | 56/10.2 A |
| 2003/0140609 A1 * | 7/2003 | Beaujot | 56/10.2 E |

FOREIGN PATENT DOCUMENTS

BR  0302769  4/2003

\* cited by examiner

PERFORMANCE

| Cut Variable | Commands (in 10 min. of operation) | Avg. Cutting Pressure (in 10 min. of operation) (psi) | Avg. Base Cutter Height (in 10 min. of operation) | Roots (per ha found in the load + ground) | Damage to the stools (graded from 0 (fixed) to 10 (lost)) | Fuel Consump. (l/t) | Machine Productivity (Elevator Working) (op/t/h) | Mineral Impurities Percentage (found by Sugar Mill per 60t truck load) |
|---|---|---|---|---|---|---|---|---|
| 2nd Cut Green Auto | 119 | 893.18 | 113.92 | 14063 | 3.4 | 0.857 | 66.53 | 0.63 |
| 2nd Cut Green Manual | 210 | 1121.80 | 95.50 | 21154 | 4.4 | 0.897 | 68.60 | 0.73 |
| 3rd Cut Green Auto | 119 | 881.75 | 103.28 | 13037 | 2.9 | 1.046 | 62.87 | 0.30 |
| 3rd Cut Green Manual | 163 | 946.23 | 110.60 | 16941 | 4.8 | 0.960 | 65.60 | 0.53 |
| 3rd Cut Green Auto | 101 | 835.51 | 130.87 | 16363 | 3.7 | 0.705 | 99.15 | 0.82 |
| 3rd Cut Green Manual | 285 | 916.70 | 129.64 | 21620 | 4.6 | 0.672 | 96.98 | 0.94 |

Fig. 8

SYSTEM AND METHOD FOR CONTROLLING THE BASE CUTTER HEIGHT OF A SUGAR CANE HARVESTER

TECHNICAL FIELD

The present invention relates to a system and method for controlling and adjusting the height of a harvesting implement of a harvesting machine, especially a base cutter of a sugar cane harvester, during a harvesting operation, and without the necessity for continuous user intervention and adjustment. The system and method can be utilized to position the base cutter unit at an optimal height for harvesting and to thereafter automatically control the positioning of the base cutter unit relative to the ground surface during operation, without the necessity for active user intervention and adjustments. Such system and method permits the machine chassis height to be automatically adjusted to account for soil irregularities and to secure more efficient and productive harvesting of a crop.

The invention is particularly applicable to machines such as sugar cane harvesters that are provided with a base cutter unit attached to the machine chassis and can be effectively employed to automatically adjust the positioning of the base cutter unit to a desirable height, dependent upon the desired cutting height, soil irregularities encountered, and the monitored cutting pressure.

BACKGROUND ART

Sugar cane harvesting or cut operations require a certain degree of precision for good crop yield. Ideally, the cut height should be at a level substantially close to the surface of the ground so as to harvest the optimal crop without damage to the equipment and at minimal cost.

If the harvest cut is made above the ideal cut height, the higher than desirable cut will result in harvest losses in the form of unharvested raw material, perhaps occasioning the need for an additional harvesting cut to try to try to recover the remaining unharvested raw material, with additional expenditures of time and additional wear and tear upon the harvesting equipment, or the loss of revenue from the unharvested raw material.

If the harvest cut is made below the ideal cut height, various, other, undesirable consequences may result. A harvest cut below the ideal height will not only result in increased damage to the plant, thereby decreasing the long term productivity of the cane plantation, but also in higher mineral levels in the harvested cane, and will cause increased damage to the base cutter knives, resulting in accelerated wear of such knives due to the constant wear against the soil. Such wear against the soil reduces productivity due to the need for more frequent stoppages of the machine for maintenance and for knife changes into fixed or floating base cutter units, and also results in higher motor and energy costs and greater waste since the equipment is required to operate in adverse or less than desirable conditions.

In light of these factors, it has long been recognized that it would be highly desirable and beneficial if harvesting machines could be provided with height adjustment means for the base cutter units that would allow the base cutter units to be moved vertically as ground irregularities are encountered during the course of the harvesting operation since such adjustability would allow both better regularization of the cut height of the raw material and a reduction in the pressure peaks associated with the cutting apparatus that would otherwise occur due to non-optimal cutting conditions. It has also been considered desirable that, in order to obtain an appropriate cut operation, while the height of the cutter disk should be adjustable, the same cut angle should be maintained regardless of the operational height.

Consequently, in view of the recognized desirability of maintaining the base cutter at a constant base cutter angle, of minimizing the undesirable index of cane escape in relation to the feed rollers, of obviating losses due to cane that drops to the soil and is not picked up by the cane harvester, and of avoiding high indices of minerals in the raw material processed by the cane harvester, various efforts to provide improved harvesting equipment have been undertaken, as a result of which various constructions have been developed.

One type of construction that has been developed employs cutter disks that are articulatedly connected to the machine chassis by means of arms in pantographic arrangement. In this type of construction, the base cutter unit is fixed to the chassis of the machine in such a way that it can be moved vertically to provide a degree of height adjustment for the disks and knives. Such type of construction has found wide use and is typical of the type of harvesting machines that employ vertically adjustable base cutter units fixed to the chassis.

One known construction of this type also includes an elevation system that can function to support all the mobile portions of the chassis as well as the base cutter unit and that is operable by the machine's operator to effect vertical movements of the base cutter unit. With this system, an operator actively controls the height of the fixed base cutter unit by operating controls to elevate or lower the unit, and, during harvesting operations, the operator attempts to monitor soil irregularities and to adjust the height of the base cutter unit accordingly so that the operating height of the cutter disk will track the soil irregularities. However, even a good operator's ability to accurately monitor and track soil irregularities, especially over an extended period of time and from a vantage point distanced to some degree from the cutting knives, is limited, and soil and other environmental conditions can compound the difficulties. Especially if the soil is not well prepared, it is difficult for the operator to accurately adjust, in an ongoing manner, the height of the cutting knives so as to, on the one hand, avoid raw material losses, generally of the richest portion of the plant, yet, on the other hand, avoid premature wear of the base cutter knives and minimize the feeding of minerals.

Such a construction utilizing a base cutter unit fixed to the chassis has been employed in a great number of sugar cane harvesters, and has been further adapted whereby elevation of the base cutter unit may be controllable not only manually, but, in some instances and under some conditions, also by semi-manual and partially automated systems, including certain systems that are responsive to pressure detection and other systems that utilize ground tracking mechanisms or systems, especially systems that employ-mechanical or electro-mechanical implements and components. In some relatively recent constructions, ground tracking and the detection of surface irregularities has been addressed through the use of various sonic and electronic techniques instead of or in addition to mechanical implements.

Some attempts to solve the problems noted above have resulted in development of constructions that make use, at least to some extent, of self leveling systems for base cutter disks. In such types of constructions, the base cutter disk is often connected to the machine chassis through an articulation, with the cutter disk operating behind the articulation and being pulled towards the surface of the soil to follow the soil irregularities. In such known constructions, the base cutter unit utilizes a support system formed by articulated arms in a pantographic arrangement, and the base cutter unit can move, and oscillate, during a cutting operation, in a vertical sense, and over a certain width, to generally follow or track undulations of the land as the harvesting machine is operated. With such constructions, the base cutter unit may thus be described as a floating unit since it seemingly "floats" at or about a relatively uniform elevation above ground level, while maintaining generally constant its inclination angle in relation to the soil.

In one particular construction, a support system is provided for each cutter disk, and that support system includes a pair of generally longitudinally extending articulation arms connected to the harvesting machine, with one arm being an upper arm and the other arm being a lower arm, the opposite ends of which arms are connected, respectively, to the chassis of the machine and to the cutter unit. The articulation arms of such base cutter device are responsive to forces acting against the base cutter disk, due to effects of the sugar cane or the soil, to effect vertical movements of the base cutter device. If the cutter disk encounters an increased resistance to its operation and forward movement, as a function of an encountered obstacle, as, for example, a mound or higher elevation in the soil contour, an upward force is applied to the articulation arms, which applied force tends to cause the cutter unit to move vertically upward.

Harvesting machines of the various construction types may typically include an indicator system that can provide to the machine operator certain information regarding the base cutter position or displacement, including information as to the intensity and frequency of movement or oscillation of the cutter disks in upward or downward directions, and particularly information as to the resulting deviation relative to the work height for which the support system of the base cutter unit has been set up. In certain of the constructions, the indicator system comprises, primarily, a flexible cable, with one end of the cable connected to the base cutter unit and the other end being associated with an indicator pointer located in the operator's cabin. In other constructions, the indicator system may make use of two hydraulic cylinders of double action operation, with one being installed in the base cutter unit and the other being associated with an indicator pointer. With the latter type of indicator system, an operator, through hydraulic pistons, can set the height of the chassis to a desired level, adapted to the soil type to be worked, and can thus define and establish a desired working height for the base cutter unit when in a nominal position.

The latter type of indicator system has found use in a construction where, after the desired working height is established for a floating base cutter unit, the floating base cutter unit attempts to follow the ground track and the cutting unit deviates from its nominal position relative to the chassis when surface irregularities are encountered, moving up and down, to try to maintain the desired working height. The displacement indicator allows the operator to monitor the degree of vertical movement of the base cutter unit relative to the chassis. In practice, however, due to system design constraints and in order to prevent damage to the harvesting machine and its components, movement of the base cutter unit relative to the chassis is limited to some maximum such that, if a significant irregularity in the ground contour is encountered, excessive displacement of the base cutter unit relative to the chassis is blocked by a respective windowsill or movement limit that is generally associated with the machine chassis. Consequently, when ground irregularities that exceed the machine's design capabilities are encountered, the base cutter unit cannot be moved sufficiently to be able to properly track and follow the ground track irregularity and the desired work height cannot be maintained.

Because information as to the amount of movement of the base cutter unit relative to the chassis is being provided to the operator via the indicator system, such as by way of an indicator pointer viewable by the operator, the operator may, by closely monitoring the information, be able to take actions to manually adjust the chassis height when conditions so warrant. When a significant ground irregularity which effects a maximum movement of the base cutter unit is encountered and information is communicated to the operator by the indicator system, the operator can command appropriate adjustments so that the movement of the base cutter unit relative to the chassis can be brought back within movement allowances, thereby permitting the base cutter unit to be moved to a better working height and/or reducing damage or wear to the cutter unit due to ground contact. However, such adjustment in the chassis height also effects a change in the nominal work height as established by the height of the chassis, and, if a corrective readjustment is not thereafter made after the significant ground irregularity has been cleared, the working height for the cutting operation, though perhaps improved as the base cutter unit traversed the ground irregularity, may thereafter, when the base cutter unit has cleared the ground irregularity, be less than optimal. The operator must therefore be prepared to quickly readjust the position of the base cutter unit when the ground irregularity is cleared. Consequently, even with such a construction, the operator must be vigilant and attentive to the indicator system as well as to the overall soil conditions and must be proactively involved in making adjustments during harvesting so as to try to maintain a desired average working height. In practice, the machine operator must typically be able to notice random ground irregularities that, while perhaps not generally severe, nonetheless effect movements, generally greater than about 60 mm., of the base cutter unit relative to the chassis, and he must be able to act quickly to elevate or lower the chassis so as to maintain the elevational positioning of the base cutter unit within the vertical movement window or range as determined by the windowsills of vertical movement, and to thereafter again quickly elevate or lower the chassis to return it to a more desirable height when the ground irregularity is cleared or other adjustment of the chassis height becomes necessary or desirable.

Although these various constructions and their systems have found broad application, the techniques of their operation still require that the operator be constantly attentive, and the base cutter efficiency remains highly dependent on the dexterity and vigilance of the operator. In light thereof, because of the frequency with which unexpected soil irregularities and intensities are encountered, and because of the degradation of responsiveness experienced by even the most skilled operators over the course of long operation periods, such well-known systems and their techniques have seldom been able to consistently achieve the efficiency desired.

With all of the noted systems and techniques, frequent and necessary adjustments in the height of the chassis are required by the operator in order to maintain the base cutter unit within its acceptable height window and to realize an optimal harvesting cut. However, even under ideal conditions and with well-rested and competent operators, the time delay between the operator's recognition that some corrective adjustment is desirable and his actions to effect the desired adjustment results in time periods during which the harvesting cut is less than ideal.

In addition, the existence of conditions which ideally would result in a recognition by the operator that some corrective adjustment is desirable is not always readily apparent or detectable by the operator. For example, if the ground surface includes a sudden elevation, but the soil is loose and not very resistant, when a cutter disk unit of a particular harvesting machine encounters such elevation, the weight of an under-central base cutter unit skate may be such that that elevation is not appropriately detected and that ground irregularity is not appropriately tracked and made evident to the operator. In such a situation, any vertical adjustment in the height of the base cutter relative to the chassis may be such that the upper movement limit is not reached and the movement indication provided to the operator shows the base cutter unit to still be within an acceptable height window. In such a situation, even though the cutter disk may be operating to an undesirable depth, and thereby demanding higher hydraulic pressure, the operator may be unaware of the condition.

While various constructions have been developed that have lessened to some extent the need for reliance upon manual adjustments, such as by employing height adjustment systems that are only semi-manual or which are partially automated to be responsive to certain monitored conditions, such as detected cutting pressure required or a detected ground surface irregularity, no known construction has heretofore employed a system for automatedly adjusting the height of the cutting apparatus to maintain an approximately desired cutting height without the need for constant and continuing operator attention and intervention.

One relatively recent development has recognized that, depending upon various conditions and circumstances, a machine operator may find it beneficial to be able to optionally select, and to be able to set the harvesting machine to selectively operate in, either a ground tracking mode, sometimes referred to as a stubble height mode, or in a pressure mode, and to vary the mode of operation as he determines appropriate for the circumstances. Although such a system affords certain advantages and provides the operator with greater flexibility in controlling the height of the cutting apparatus, each operating mode continues to suffer from the attendant disadvantages for that mode, and significant continuing operator attention and intervention remains necessary.

The present invention is intended to alleviate at least certain of the noted disadvantages and problems by providing a control system that can rely on both ground tracking information and cutting pressure information to automatedly adjustably control the chassis height, and the height of an associated base cutter unit, of a harvesting machine during a harvesting operation, and to thereby better effect a harvesting cut at an average cut height as predefined by the operator of the harvesting machine, with improved pressure maintenance, and without the need for continual user intervention to make adjustments for ground surface irregularities.

In addition, the present invention is intended to provide a control system that can be easily incorporated into many pre-existing harvesting machines and a manner and method of operation in accordance with which previous harvesting machines can be readily modified to operate without requiring significant alterations in the pre-existing machine controls and systems that are in use for adjusting chassis height.

SUMMARY OF THE INVENTION

The present invention comprises a control system, and a method of operation therefor, for controlling the positioning of a base cutter unit of a harvesting machine, such as a sugar cane harvester, during a harvesting operation. The harvesting machine with which the unit is utilized will typically include a chassis supported by wheels or track support apparatus or other suitable mobile support mechanisms, a chassis height adjustment system operable to vary the height of the chassis relative to the ground, and a base cutter unit associated with the chassis. The base cutter unit may be of known construction and may include cutting apparatus, such as rotary cutter disks with knives powered by a hydraulic motor, and an associated pressure sensor for sensing the cutting pressure being applied and producing corresponding cutting resistance signals. The base cutter unit is operatively coupled to the chassis so as to be vertically movable with the chassis as the height of the chassis is varied, and has an associated ground track system that is generally operable to produce base cutter height position signals generally indicative of the height of the base cutter unit above the detected ground surface as the harvesting machine traverses and encounters ground surface irregularities in a particular ground track. Such ground track system may be of various known mechanical, electromechanical, or electronic designs, including skate or shoe follower systems, ultrasonic systems, electromagnetic, or radar type systems, or of other designs that will produce like signals.

The control system comprises a processor unit that includes a user interface portion at and through which a user may enter data and control information, a monitor input portion operatively connected to receive base cutter height position signals and cutting resistance signals, and a controller output portion operatively connected to the chassis height adjustment system to control the operation of such chassis height adjustment system. In the practice of the present invention, the processor operates following initiation of program operation by a machine operator, under program control during a harvesting operation, to simultaneously monitor both the base cutter height position signals and the cutting resistance signals as the harvesting machine traverses a particular ground track and to automatedly control the adjustment of the chassis height above the ground surface so that the cutting apparatus of the base cutter unit is continuously adjusted to cut at approximately the desired cutting height, within an acceptable vertical height or movement range or bandwidth, during the course of the harvesting cut operation, without the need for operator intervention.

The control program cyclically checks to determine whether or not the cutting resistance signal at the time of check is less than a pre-established maximum value, and, if so, then checks to determine whether or not the cutting apparatus is at a height within a predetermined acceptable vertical height or movement range of the pre-established desired cutting height, as determined from the base cutter height position signal. So long as the detected conditions require no adjustments, and no outside or other inputs or user interventions interrupt the program, continuing cyclical checks will be performed.

However, in the event that an overpressure condition is detected, the processor will operate to communicate to the chassis height adjustment system a control signal to effect an operation thereby to raise the height of the chassis by a pre-determined increment, and will thereafter re-initiate the cyclical checks.

If no overpressure condition is detected, but the cutting apparatus is determined to be at a height outside of the acceptable vertical movement range, the processor will operate to communicate to the chassis height adjustment system a control signal to effect an operation thereby to adjust the height of the chassis by a predetermined increment, and will thereafter re-initiate the cyclical checks. If the detected height of the cutting apparatus is determined to be above the predetermined upper level limit for the vertical movement range, the processor will operate to communicate to the chassis height adjustment system a control signal to effect an operation thereby to lower the height of the chassis by a predetermined increment, and will thereafter re-initiate the cyclical checks. On the other hand, if the detected height of the cutting apparatus is determined to be below the predetermined lower level limit for the vertical movement range, the processor will operate to communicate to the chassis height adjustment system a control signal to effect an operation thereby to raise the height of the chassis by a predetermined increment, and will thereafter re-initiate the cyclical checks.

The control system thus operates to respond quickly to encounters by the harvesting machine with soil irregularities to maintain the cutting apparatus at approximately the desired cutting height, and controls adjustments in the height of the chassis and the base cutter unit so that the height of the cutting apparatus will generally be maintained within the acceptable vertical height or movement range during a harvesting cut. Such action is accomplished automatically and without the necessity for frequent user intervention. Upon clearing a soil irregularity that has given rise to an adjustment in chassis height, and a return to initial conditions, the system operates, under the noted program control, to quickly readjust the chassis height back towards its initial status.

Through the user interface, the operator may provide operation specific data and information, such as the initial desired cutting height, the upper and lower level limits for the acceptable vertical height or movement range, the overpressure level limit, and other data or settings or default values, and may initiate the cyclical checks and enter any override or interrupt commands considered appropriate. Depending upon circumstances and designs, certain parameters may be fixed or preset, and no entry for such parameters will necessarily need to be made by the operator for such parameters.

If desired, particularly for extended operations, the program may also periodically permit or require the entry of new or updated data, such as an updated desired cutting height, or may compare the operating status at a particular time against initial or subsequent conditions, and make suitable and appropriate corrections or adjustments.

Preferably, the user interface portion of the processor unit will include a display at or upon which the operator will be able to view pertinent and/or desirable information regarding the harvesting machine and the harvesting operation.

These and other objects and advantages of the present invention will become apparent after considering the following detailed specification in conjunction with the accompanying drawings, wherein:

BRIEF DESCRIPTION OF THE DRAWINGS

FIG. 8 is a table presenting comparisons of various performance attributes associated with three sets of comparable harvesting cuts, wherein each set includes performance data associated with a harvesting cut made utilizing a preferred embodiment of the invention for automated control of the chassis height system and other performance data associated with a like harvesting cut made relying upon manual control of the chassis height adjustment system.

DETAILED DESCRIPTION OF THE PREFERRED EMBODIMENTS

Figure 1:
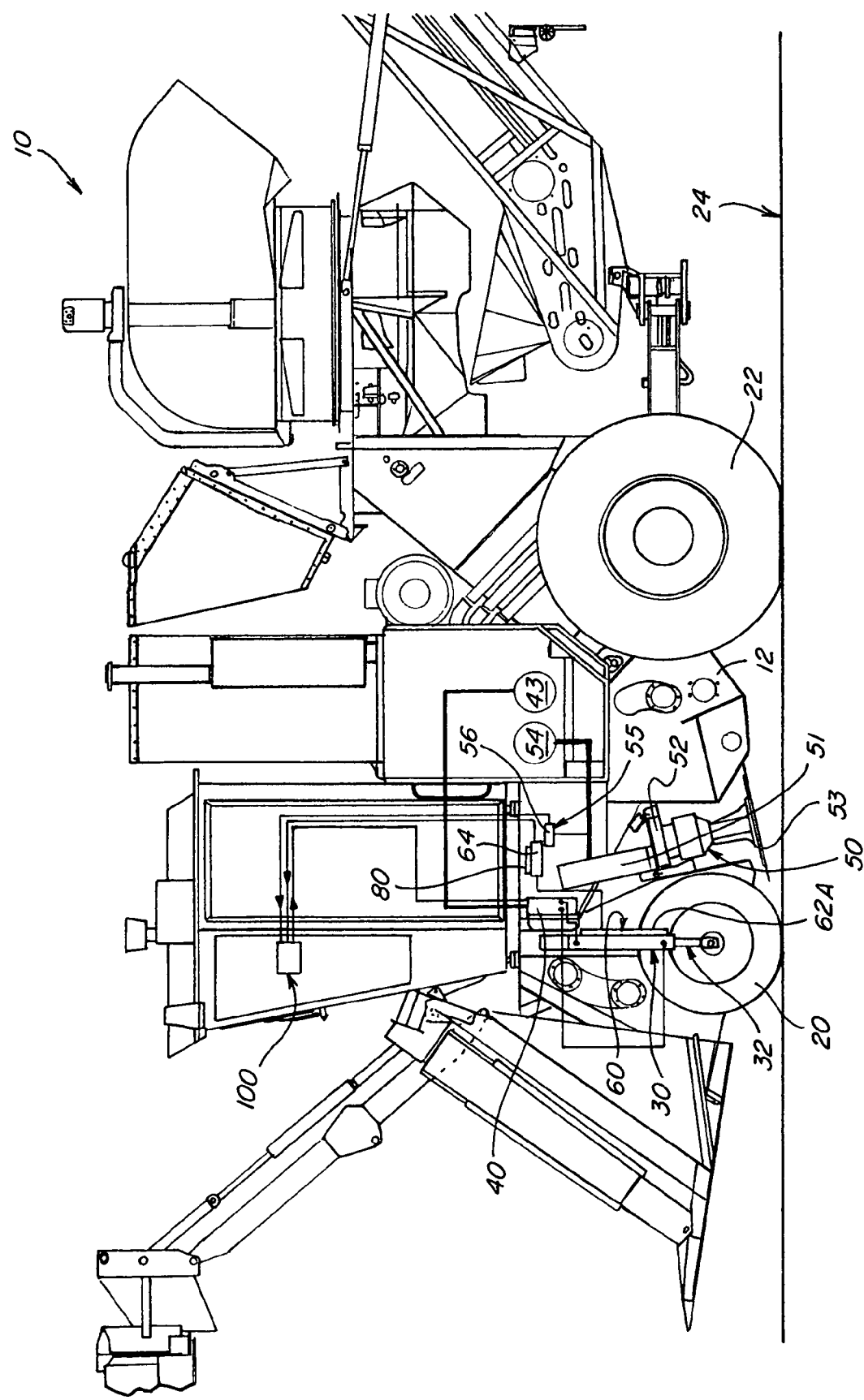
FIG. 1 is a partial side view depicting, partly in representational form, a sugar cane harvester constructed in accordance with the present invention.
Figure 2:
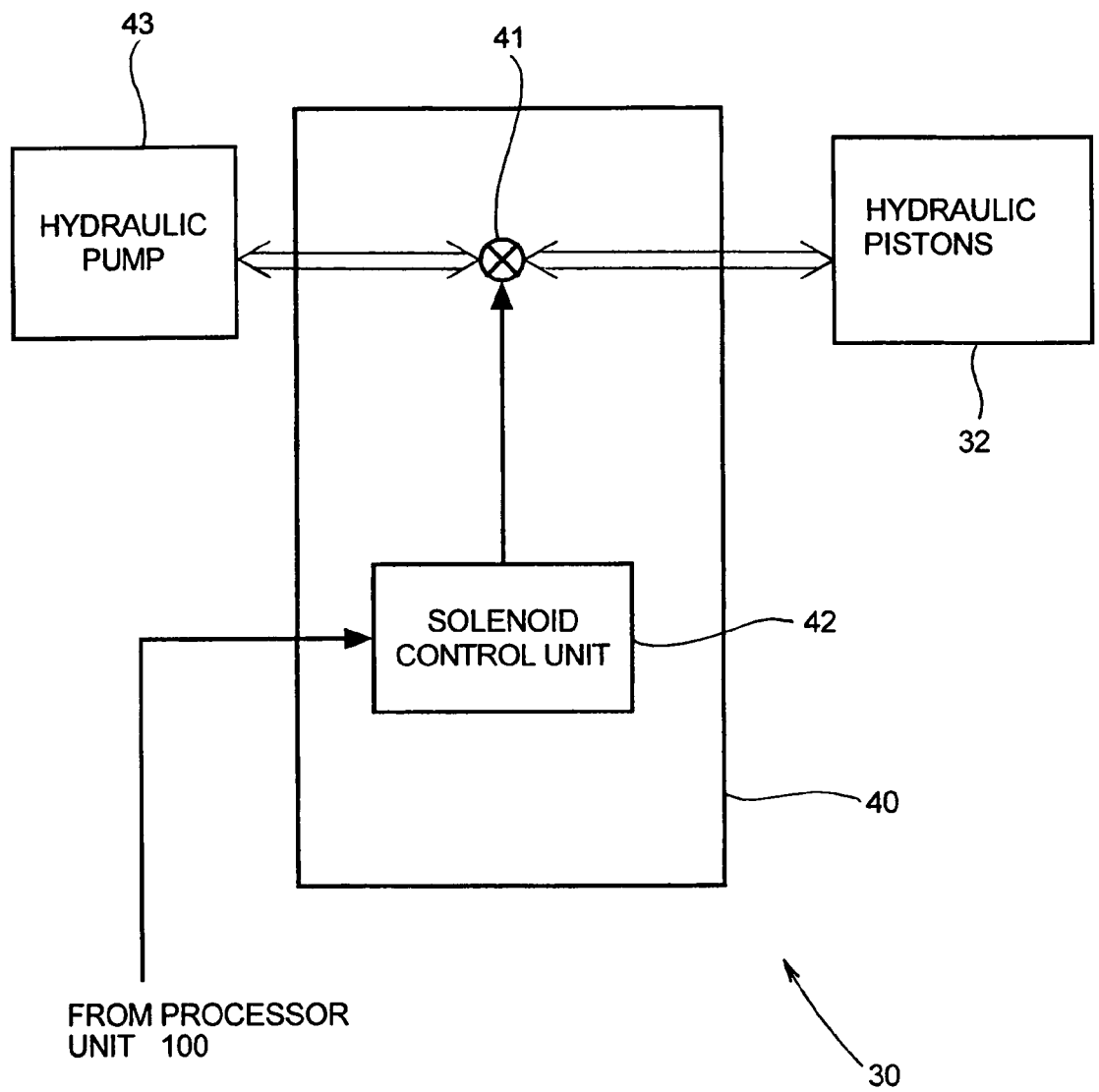
FIG. 2 is a simplified representation of the chassis height adjustment system of a preferred embodiment of the present invention.
Figure 3:
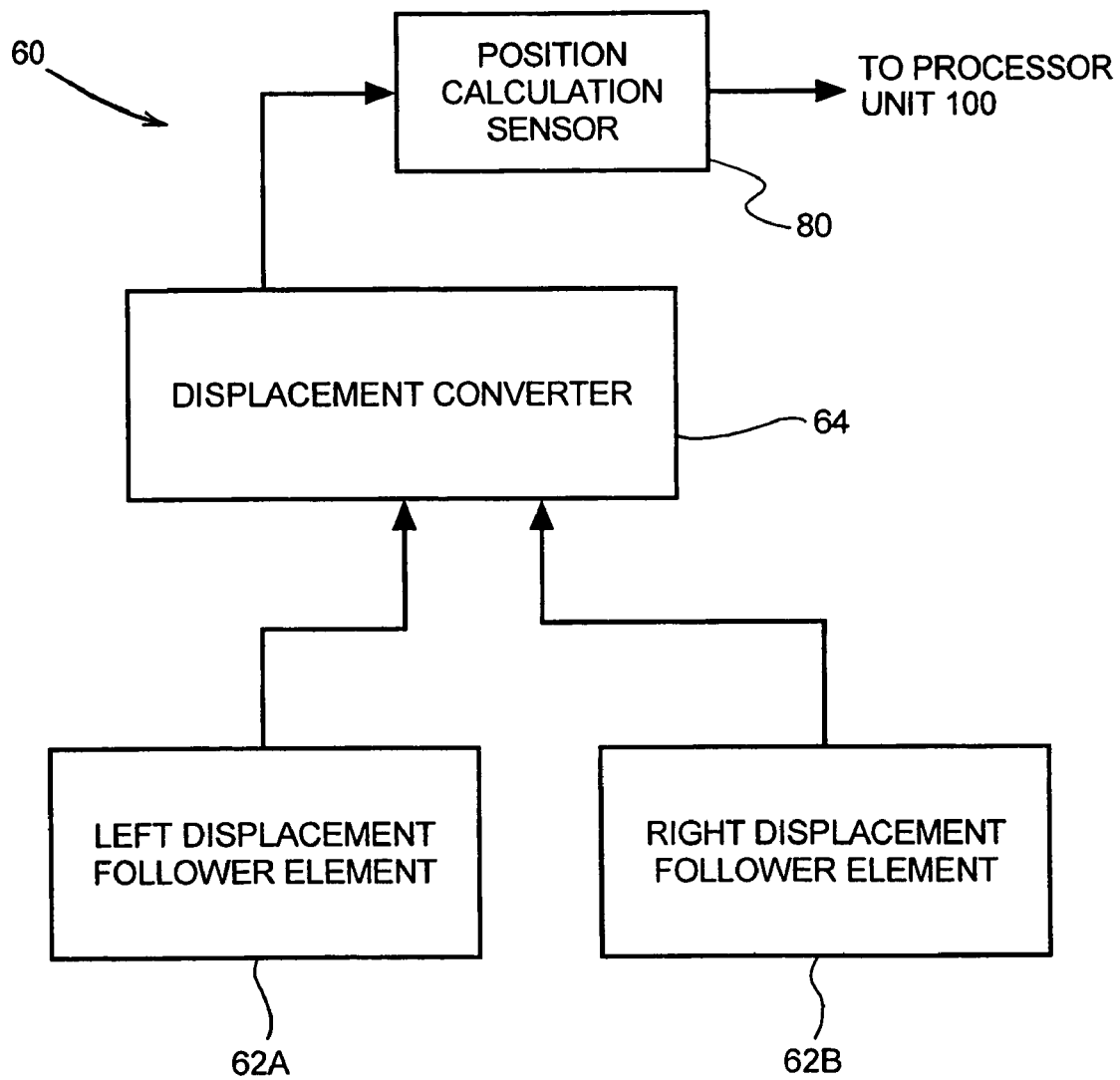
FIG. 3 is a simplified representation of the ground track system of a preferred embodiment of the present invention.
Figure 4:
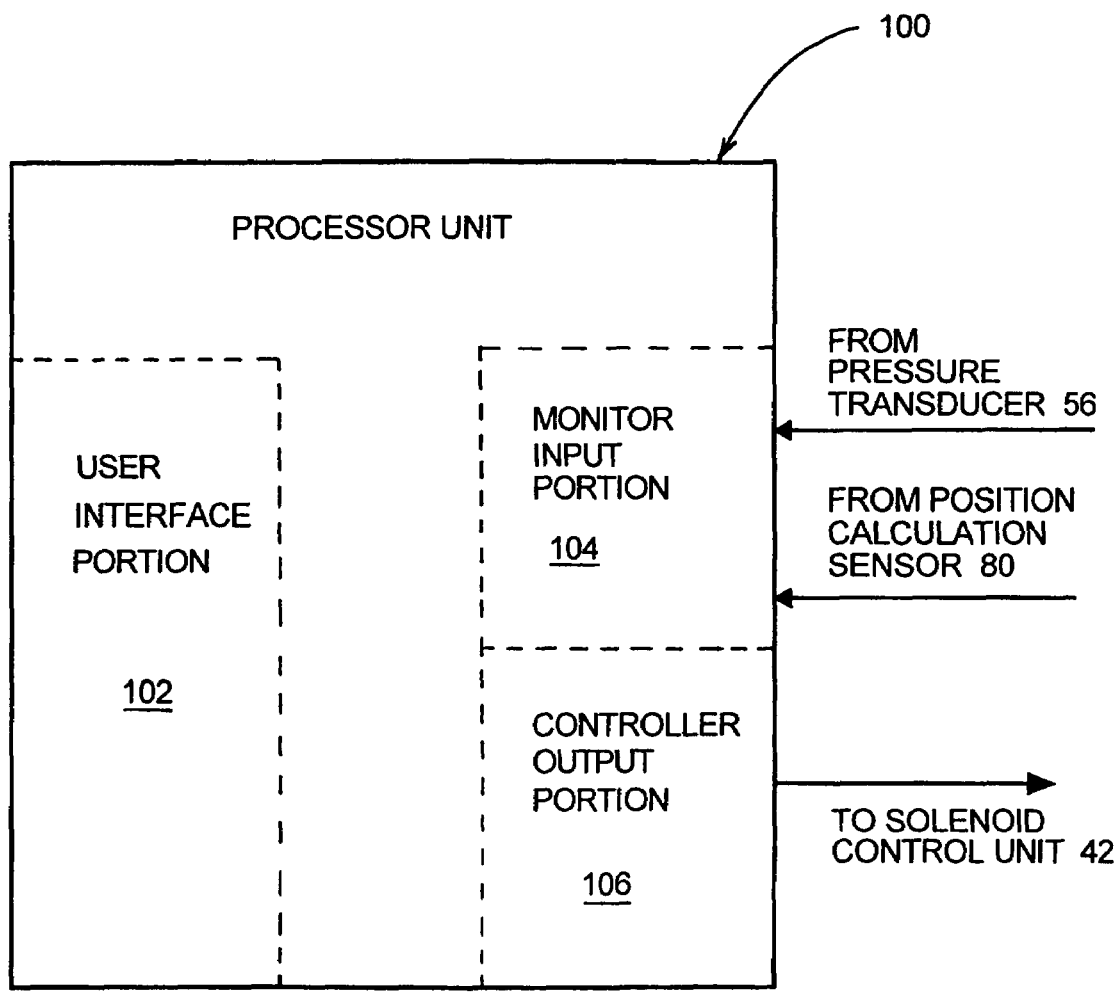
FIG. 4 is a generalized representation of a processor unit as included in a preferred embodiment of the present invention.

Referring now to the drawings wherein like numbers refer to like items, FIG. 1 depicts, in a partial side view, a sugar cane harvester 10, generally of known construction, having a chassis 12 supported by support members which, in this illustration, are pairs of front and rear wheel members 20 and 22, upon a ground surface 24. A preferred chassis height adjustment system 30 includes double action hydraulic pistons 32 that connect chassis 12 to wheel members 20 and which operate under control of an elevation controller unit 40. The elevation controller unit 40, as shown in simplified form in FIG. 2, preferably includes a multidirectional hydraulic valve 41 operatively electrically connected to be controlled by solenoid control unit 42, and is hydraulically connected between a hydraulic pump 43, typically positioned in the vicinity of circled numeral 43 in FIG. 1, and the hydraulic pistons 32. Solenoids within solenoid control unit 42 may be actuated, as will be further discussed hereinafter, to effect adjustments in the height of the chassis 12 relative to the ground surface through the hydraulic pistons 32 according to well known principles of operation. Typically, but not necessarily, like wheel members and hydraulic pistons will be associated with each side of the sugar cane harvester 10.

Although the sugar cane harvester depicted has wheel members and a hydraulic chassis height adjustment system, it will be appreciated that track or other support mechanisms could be equally as well employed and that other types of chassis height adjustment systems, including pneumatic systems and other mechanical and electromechanical systems, including systems employing wired or wireless controls, could also be equally as well employed. The particular features of such support mechanisms and chassis height adjustment systems are not considered critical to the present invention or its practice.

A base cutter unit 50, which may also be of any well known design and operation, or of any other design that operates to the same purpose, and whose particular features are likewise not considered critical to the practice of the present invention, is shown connected to the chassis 12. In the preferred embodiment depicted, such base cutter unit 50 includes a hydraulic motor 51 which is operatively coupled through a gear box 52 to drive a rotary cutter disk 53 equipped with cutting knives and which is operatively connected to a hydraulic pump 54, typically positioned in the vicinity of circled numeral 54 in FIG. 1. Such base cutter units and the components thereof and their operation are well known within the art. Typically, but not necessarily, like cutting apparatus may be associated with each side of the sugar cane harvester 10.

A pressure sensing system 55, including, in the preferred embodiment, a pressure transducer 56, is operatively associated with the hydraulic motor 51 of base cutter unit 50 to monitor the oil pressure of the motor as it operates. When the rotary disk cutter 53 encounters increased resistance to cutting, such as due to an encounter with an elevated mound on the ground surface, an increased load is placed upon the hydraulic motor 51, and the oil pressure increases. The detected oil pressure is thus dependent upon the cutting resistance encountered, and pressure transducer 56 produces cutting resistance output signals, the purpose and use of which will be further addressed hereinafter. As with the other components that have been discussed hereinabove, the particular type and design of pressure sensing system employed is not considered critical to the practice of the present invention. Alternative systems that produce cutting resistance signals representative of the resistance encountered by the cutting apparatus during harvesting operations could be equally as well employed.

A ground track system 60 is also provided to detect the height of the base cutter cutting apparatus above the ground surface as the harvesting machine and its base cutter unit 50 traverse a ground track. In the preferred embodiment depicted, the base cutter unit 50 is fixedly connected to the chassis 12 in such a way that the chassis 12 and the base cutter unit 50 move vertically in conjunction with one another. Since, with the preferred embodiment depicted, a correspondence thus exists between the height of the base cutter and its cutting apparatus and the height of chassis 12, the preferred ground track system 60 includes left and right displacement follower elements 62A and 62B each associated with a respective wheel member 20 and its associated hydraulic piston 32, a displacement converter 64, and a position calculation sensor unit 80, which components and their operations are also well known in the art. In general, the displacement follower elements 62A and 62B are each associated with a respective wheel/piston assemblage to detect distances between such elements and the ground and to provide data representative thereof to the displacement converter 64 which acts to convert such data to displacement signals that are provided to the position calculation sensor unit 80. Due to the correspondence between the base cutter and its cutting apparatus and the height of chassis 12 above the ground surface, such displacement signals are also representative of the height of the cutting apparatus of the base cutter unit, or a particular point, e.g., the disc cutter axis point of the cutting apparatus, above ground surface. The data communicated by the displacement follower elements to the displacement converter may take many possible forms and be communicated by various means and linkages, including, but not limited to, hydraulic, mechanical, and electrical elements, including both wired and wireless connections. Typically, the displacement converter will act to combine and/or convert the data that it receives from the displacement follower elements 62A and 62B and to produce a signal type recognizable and usable by the position calculation sensor unit 80. Typically, although not necessarily, such signals will be electrical in nature, at least for the preferred embodiment addressed herein, and the position calculation sensor unit 80, which may preferably be a non-contact linear transducer, will output signals identified as base cutter height position signals, the use of which will be further addressed hereinafter.

As with the other components that have been discussed hereinabove, the particular type and design of the ground track system employed is not considered critical to the practice of the present invention, provided such ground track system can produce signals representative of the height of the base cutter unit as the harvesting machine transverses a ground surface track.

The preferred embodiment includes a processor unit 100 having a user interface portion 102 at or through which data and control information can be entered into the control system by a machine operator, a monitor input portion 104 operatively connected to pressure transducer 56 and to position calculation sensor unit 80 to receive therefrom the cutting resistance and base cutter position signals, and a controller output portion 106 operatively connected to the chassis height adjustment system 30 to control the operation of such chassis height adjustment system.

Preferably, the user interface portion will include a display for displaying to the machine operator certain information and data. The particular design and layout of any user interface portion is not considered critical to the invention, so long as such user interface portion includes suitable means and mechanisms to allow the operator to be able to input data and control information, such as by way of switches, buttons, knobs, keyboards, or the like, or by way of audio commands, or through infrared or radio commands, including wireless and Bluetooth communications devices.

The processor unit 100 will typically be designed and/or programmed to permit the operator to selectively determine whether the processor unit 100 operates at any point in time under direct control of the operator or in accordance with a programmed control. Typically, even when the processor unit 100 operates under program control, the operator may interrupt the programmed operation or otherwise assume direct control through the entry of data or control information at the user interface portion.

Figure 5:
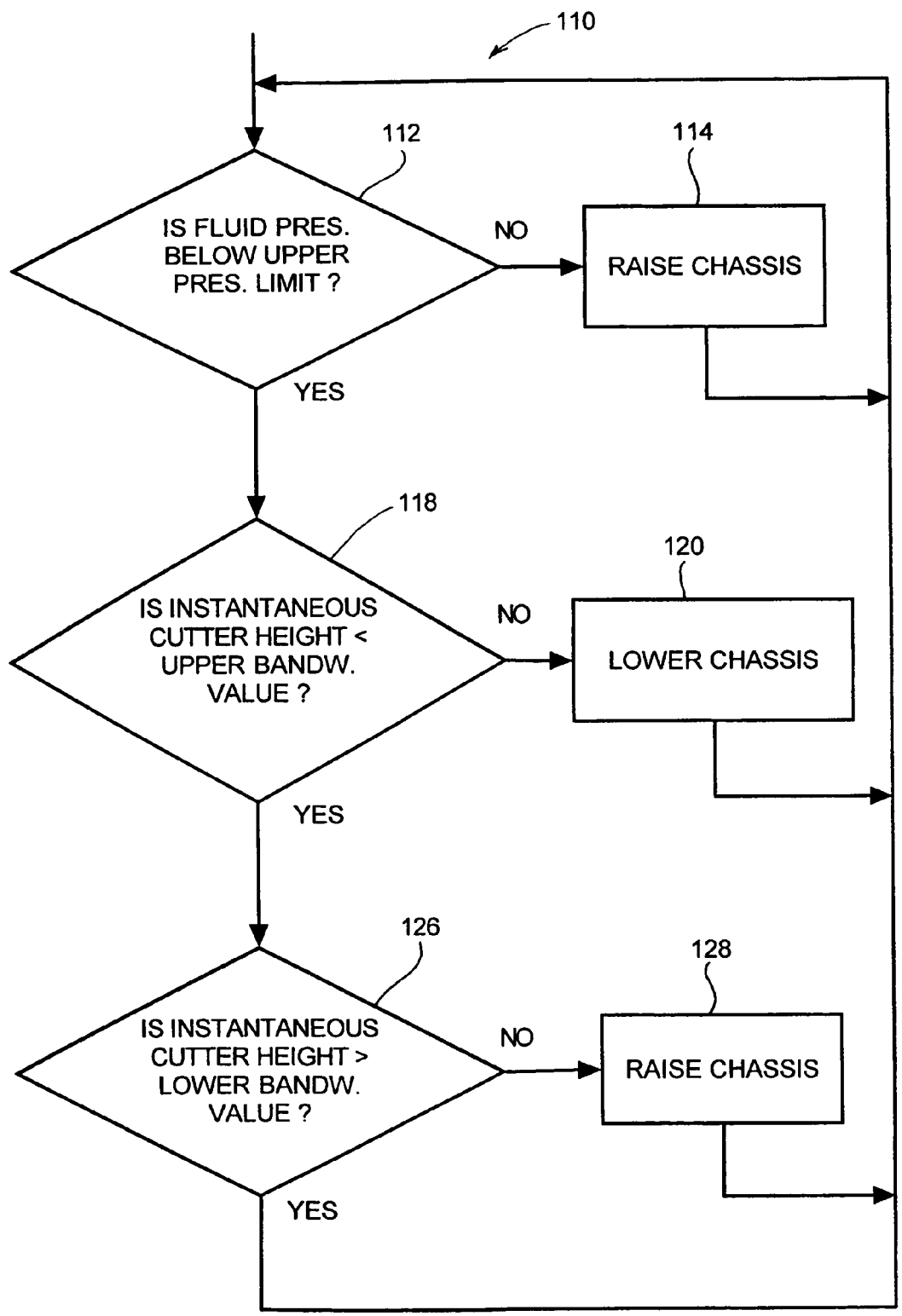
FIG. 5 is a simplified flowchart generally depicting the operational flow of a preferred embodiment of a control program for the present invention.

In the preferred embodiment, the processor unit 100 is operable under program control, after establishment of maximum pressure, a desired working height, and a permissible base cutter height deviation range, such as by the use of predetermined default values and/or the entry by an operator of data and control information through the user interface portion, to monitor the cutting resistance signals and base cutter position signals being provided to the processor unit 100 during a harvesting operation and to produce signals to control the chassis height adjustment system 30 upon the occurrence of certain conditions. FIG. 5 depicts a partial flowchart for a preferred control program that sets forth the sequence or method 110 of operationally controlling the chassis height adjustment system 30 as the cutting resistance and base cutter height position signals are monitored.

In general, the method checks both the detected pressure and the detected base cutter height in an ongoing cyclical manner of testing to determine whether any adjustment in the height of the chassis is desirable. In the preferred form of cyclical operation, the processor unit 100 operates under program control to check whether the fluid pressure is below the upper pressure limit that has been established, as at decision block 112 of FIG. 5, and, if the detected fluid pressure is not below the upper pressure limit, signifying that the cutting apparatus has encountered an undesirable resistance, such as by attempting to cut below the ground surface, by proceeding to operation block 114, in accordance with which the processor unit 100 will operate under program control to produce a control signal at the output control portion of processor unit 100 that will be communicated to chassis height control system 30 to effect operation thereof to raise the chassis by an incremental amount. Such increment may be a value as established by design parameters or by default or as determined by entry of data and control information by an operator. The control program will thereafter re-initiate the testing cycle.

If the pressure detected at decision block 112 is less than the predetermined upper limit value, the control program will proceed to then check to determine whether the detected height of the base cutter unit 50 falls within the predetermined acceptable base cutter height range. If so, the program will re-initiate the testing cycle. On the other hand, if the detected height of the base cutter unit 50 is not within the predetermined acceptable base cutter height range, the processor unit 100 will operate under program control to produce a control signal at the output control portion of processor unit 100 that will be communicated to chassis height control system 30 to effect operation thereof to adjust the height of the chassis upwardly or downwardly by an incremental amount. Such increment may be the same or different from the increment associated with detection of an overpressure condition and, like the increment associated with detection of an overpressure condition, may be a value as established by design parameters or by default or as determined by entry of data and control information by an operator. Once the control signal is produced, the control program will thereafter re-initiate the testing cycle.

With the preferred control program as depicted in FIG. 5, such check of the base cutter height is accomplished by proceeding from decision block 112 to decision block 118, at which point in the program a check is made to determine if the detected base cutter height is below the upper value of the acceptable height range. If not, which signifies that the base cutter unit 50 is then positioned at an unacceptably high height, the program will proceed to operation block 120, in accordance with which the processor unit 100 will operate under program control to produce a control signal at the output control portion of processor unit 100 that will be communicated to chassis height control system 30 to effect operation thereof to lower the chassis by an incremental amount. Once the control signal is produced, the control program will thereafter re-initiate the testing cycle.

If the testing at decision block 118 reveals that the detected base cutter height is below the upper value of the acceptable height range, the program proceeds from decision block 118 to decision block 126, at which point in the program a check is made to determine if the detected base cutter height is above the lower value of the acceptable height range. If not, which signifies that the base cutter unit 50 is then positioned at an unacceptably low height, the program will proceed to operation block 128, in accordance with which the processor unit 100 will operate under program control to produce a control signal at the output control portion of processor unit 100 that will be communicated to chassis height control system 30 to effect operation thereof to raise the chassis by an incremental amount. Once the control signal is produced, the control program will thereafter re-initiate the testing cycle.

It will be appreciated by those skilled in the art that the testing sequence depicted in FIG. 5 identifies only the more significant aspects of the present invention as effected in a preferred control program, and that the control program may include other and additional steps and operations than those shown, and may include or make use of various techniques that would permit the testing cycle to be interrupted by the occurrence of certain conditions or by a decision by the operator. The aspect of the control program that is of significance to the present invention is the reliance upon and use of both the cutting resistance encountered by the cutting apparatus and the base cutter unit height for controlling adjustment of the height of the cutting apparatus so as to better maintain an approximated desired cutting height.

If desired, additional steps could be provided that would compare conditions at a given point in time with initial or other conditions and to effect certain operations or adjustments based upon such comparisons, such as, by way of example only and not by way of limitation, a return of the chassis to the initial height or to entry either by the program itself or by the operator of an updated desired working height or other parameters.

Although the processor unit 100 preferably includes a microprocessor and a stored control program, it should be appreciated and understood that other mechanisms, including electronic, electromechanical, and/or mechanical assemblages may also be utilized in place of a software programmed microprocessor, including, by way of example only and not by way of limitation, programmable and programmed logic arrays, interconnected hard-wired components, or mechanical stepper controls.

It has been found that a control system as disclosed herein can markedly improve the harvesting cut that can be realized. The control system of the present invention operates to automatedly adjust the chassis height to better avoid and minimize overpressure conditions while better maintaining the base cutter unit at an optimal cutting height.

Figure 6A:
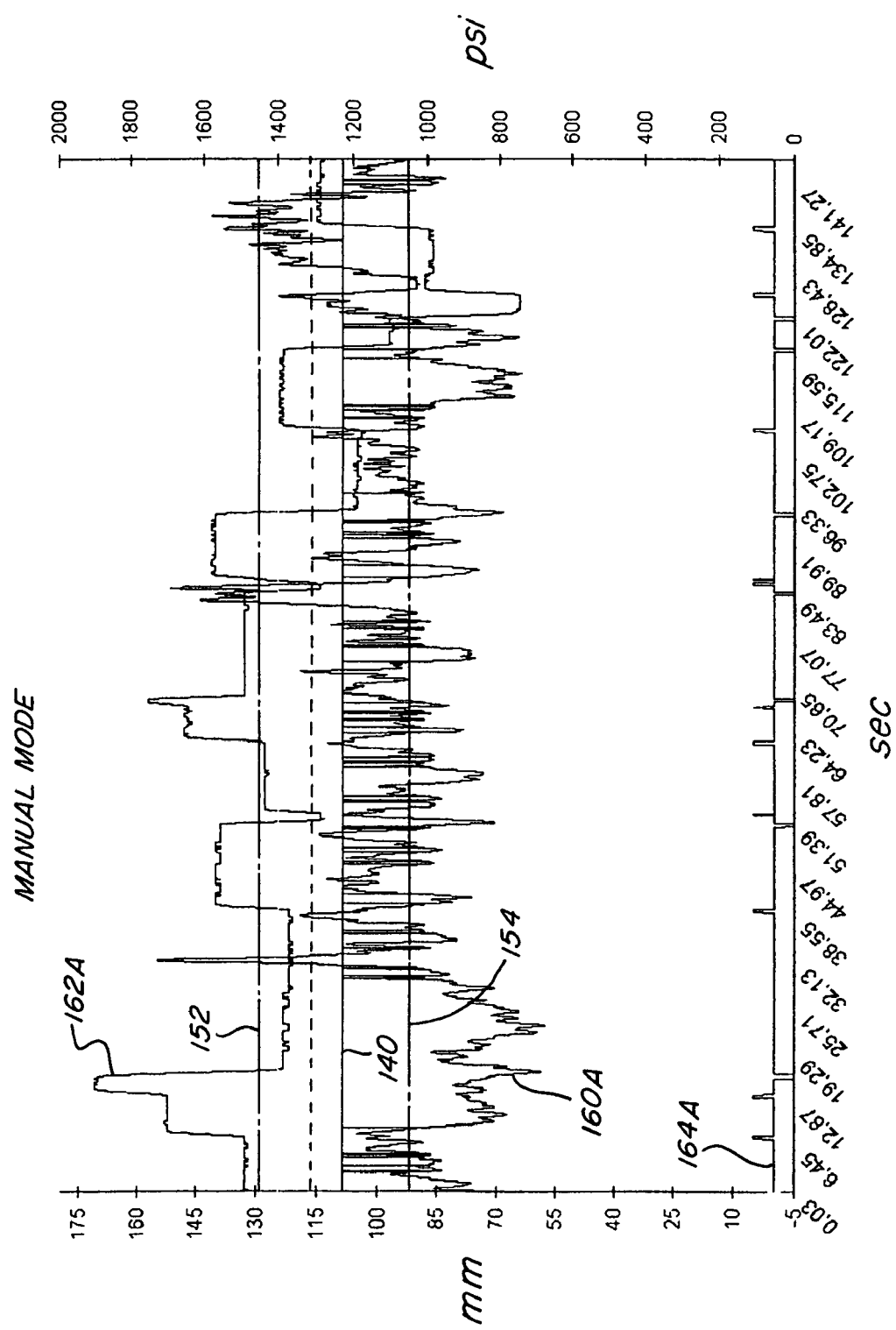
FIGS. 6A and 6B depict the detected pressure and base cutter height signals during a typical harvesting operation in which the height of the base cutter unit was controlled by the machine operator.
Figure 6B:
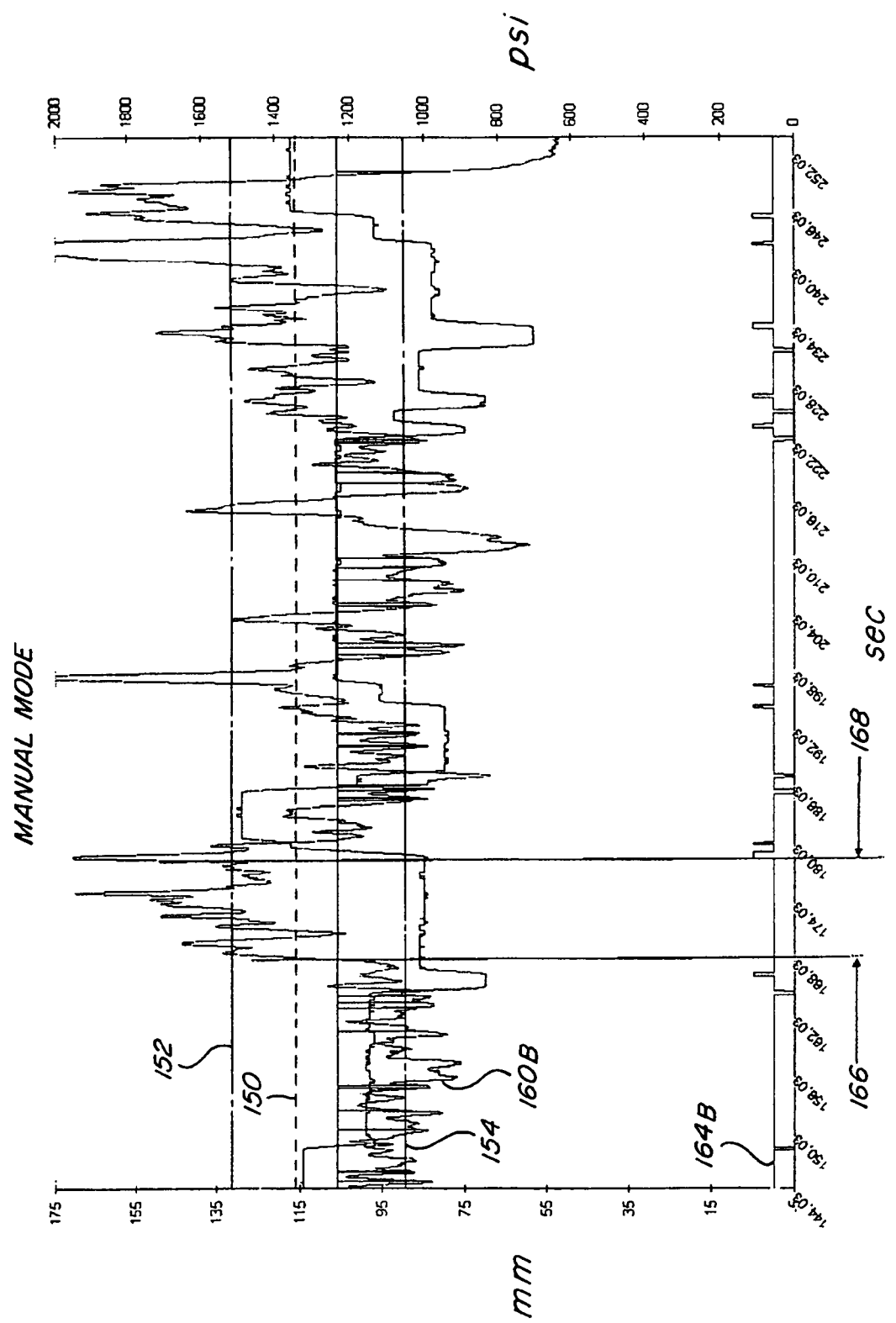
Figure 7A:
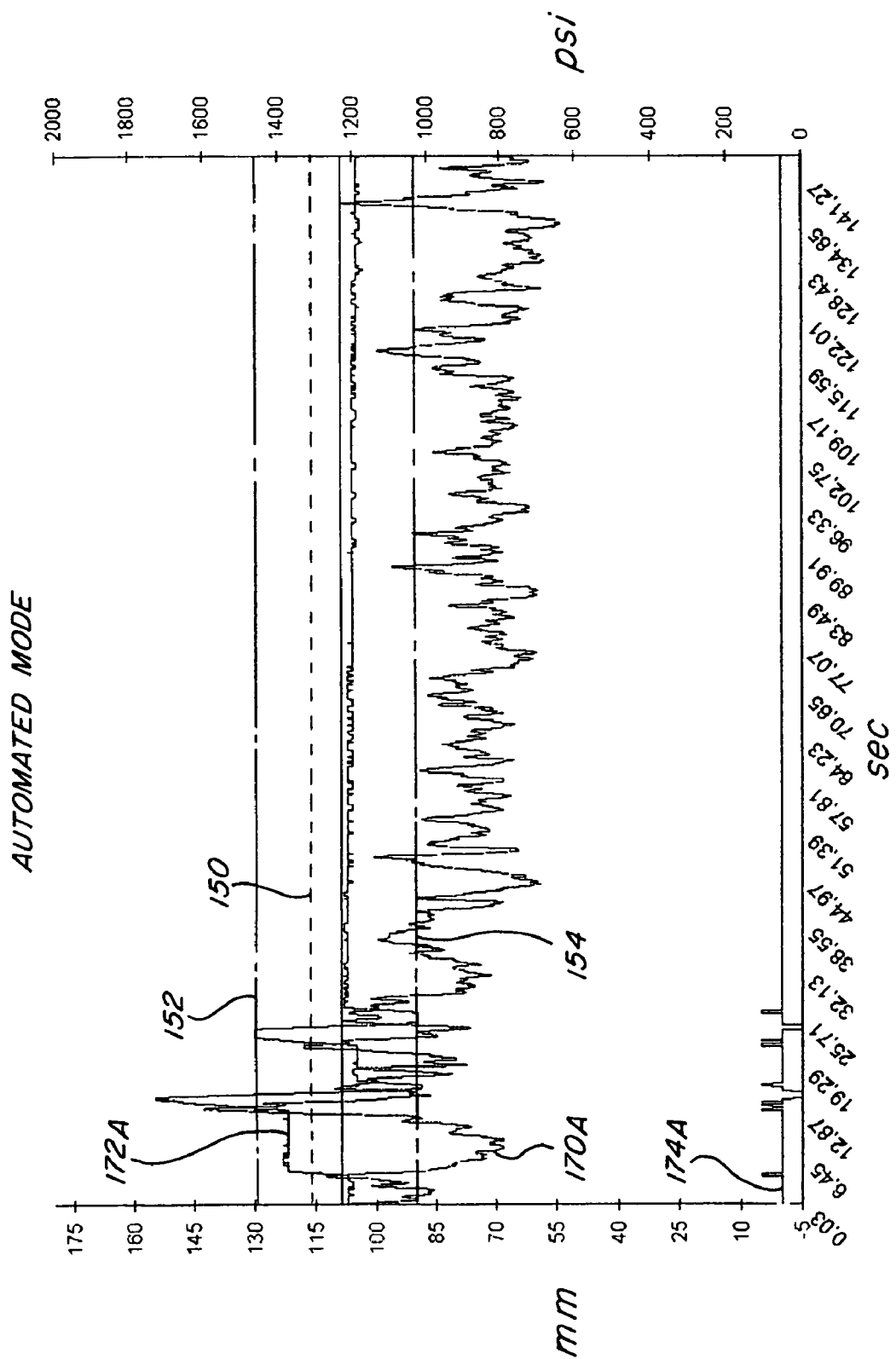
FIGS. 7A and 7B depict the detected pressure and base cutter height signals during a like, typical harvesting operation in which the height of the base cutter unit was automatedly controlled by the preferred embodiment of the present invention.
Figure 7B:
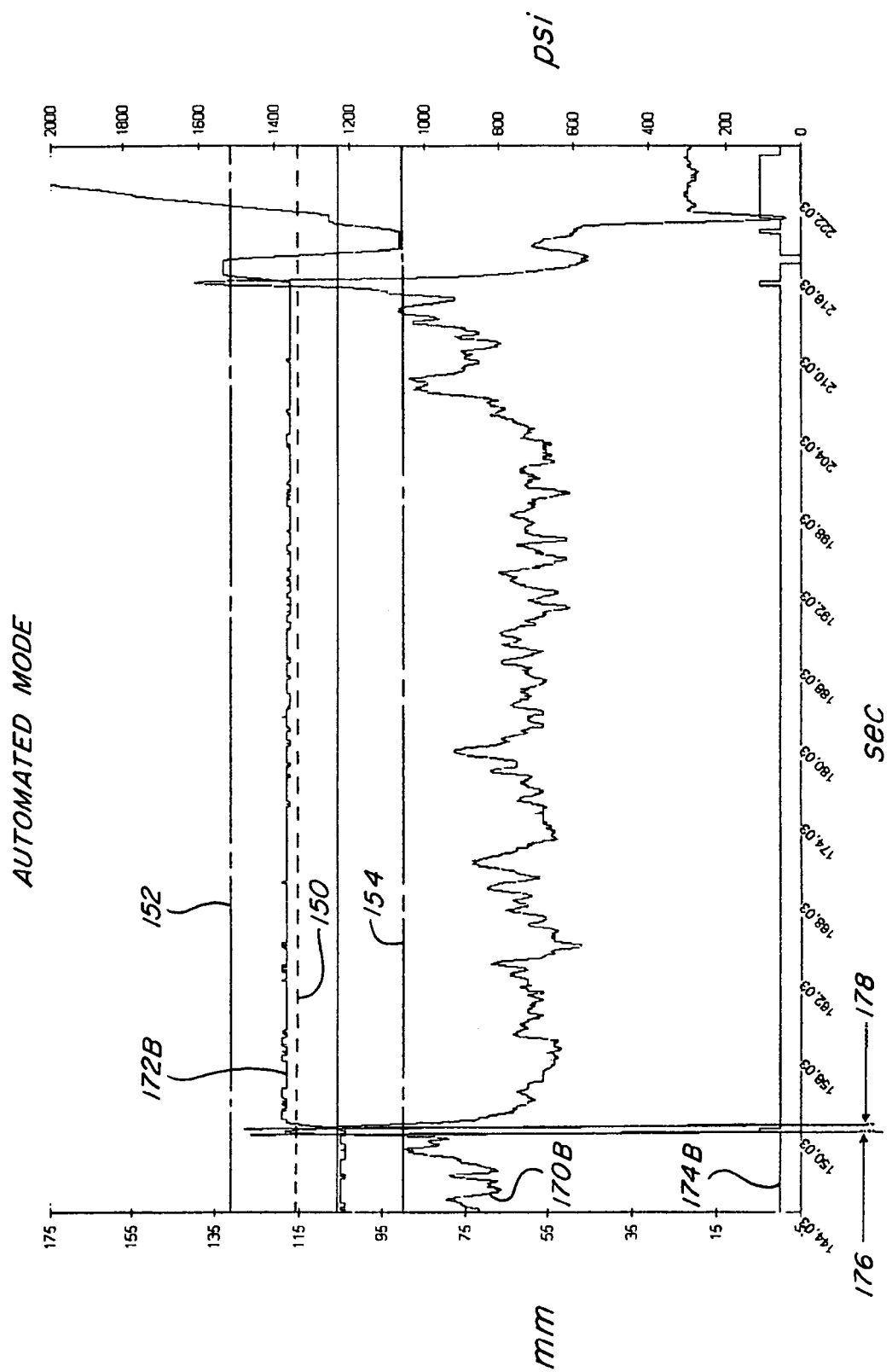

FIGS. 6A and 6B illustrate the variations in pressure and base cutter height that occurred in one typical, illustrative harvesting operation when the machine operator manually monitored and controlled adjustment of the base cutter height positioning, while FIGS. 7A and 7B illustrate the variations in pressure and base cutter height that occurred in a like harvesting operation when the preferred embodiment of the present invention automatedly monitored and controlled adjustment of the base cutter height positioning. Such figures include tracks of the detected pressure and base cutter height positions during the course of the harvesting operation, as well as indications of the times at which adjustment commands were produced.

In each of such noted figures, a time scale is included at the bottom of the graphical representation, a pressure scale is included on the right side of the graphical representation, and a height scale is included on the left side of the graphical representation. For each of the harvesting operations, the upper pressure limit for the cutting apparatus was established as approximately 1230 psi, as is denoted by the horizontal line 140 in each of the figures. Each of such figures also includes a dashed horizontal line 150 which denotes a base cutter height level such as might be considered desirable for the harvesting operation as well as other dashed lines 152 and 154 which denote respective upper and lower bandwidth or height levels such as might similarly typically be considered appropriate or desirable for such operations.

Tracks 160A and 160B in FIGS. 6A and 6B indicate the detected pressure during the course of the illustrative harvesting operation when adjustments were being manually commanded, while tracks 162A and 162B indicate the corresponding base cutter heights detected at those times. Tracks 164A and 164B, located near the bottoms of the graphical representations of FIGS. 6A and 6B indicate the corresponding times at which commands to adjust the height of the base cutter unit were effected by the operator, with upward spikes in such tracks identifying commands to raise the chassis and downward spikes identifying commands to lower the chassis.

Such FIGS. 6A and 6B visually illustrate the difficulties encountered by an operator in trying to maintain the base cutter at an optimal height for cutting while also trying to avoid overpressure conditions. As is illustrated in FIG. 6B by the vertical lines 166 and 168, representing two times, a significant time delay can often transpire between the occurrence of an overpressure condition, as at the time associated with vertical line 166, the recognition by an operator of the overpressure condition, and the issuance of a command by the operator, as at the time associate with vertical line 168, to effect an adjustment of the chassis height to alleviate the overpressure condition. As is indicated by such lines 166 and 168, a time delay of approximately 11 seconds transpired between the occurrence of an overpressure condition and the issuance of a command by the operator to effect an adjustment in the height of the chassis. During that single delay, a harvester moving at 4 km./hr. during the harvesting operation traverses approximately 12.2 meters. Such delay results in increased wear and tear upon the equipment, and, since the accompanying height of the base cutter during that delay was at a height below the lower bandwidth limit, crop harvesting during that delay suffered for the reasons that have been previously discussed. Additionally, as is clearly evident from FIG. 6B, such operator delay time is not the total delay from the occurrence of an overpressure condition to alleviation of such condition. An additional time passes, and a further command is initiated, before the overpressure condition is alleviated. Over the course of a harvesting cut, such difficulties and their effects are cumulative.

Tracks 170A and 170B in FIGS. 7A and 7B indicate the detected pressure during the course of a comparable illustrative harvesting operation across a similar ground track when adjustments were being commanded by the preferred embodiment of the present invention, while tracks 172A and 172B indicate the corresponding base cutter heights detected at those times. Tracks 174A and 174B, located near the bottoms of the graphical representations of FIGS. 7A and 7B indicate the corresponding times at which commands to adjust the height of the base cutter unit were effected by the preferred embodiment of the present invention, with upward spikes in such tracks identifying commands to raise the chassis and downward spikes identifying commands to lower the chassis.

As is illustrated in FIG. 7B by the vertical lines 176 and 178, representing two times, a marked improvement can be achieved with the preferred embodiment of the present invention by the automated detection of an overpressure condition and generation of a command to adjust the chassis height to alleviate the overpressure condition, all while better maintaining the base cutter height at approximately the desired cutting height. As is indicated by such lines 176 and 178, a total time delay of approximately 0.36 seconds transpired between the occurrence of an overpressure condition, as at the time associated with vertical line 176, to alleviation thereof, as at the time associated with vertical line 178. During that delay, a harvester moving at 4 km./hr. during the harvesting operation traverses only approximately 0.4 meters. Consequently, the wear and tear upon the equipment is minimized and, since the accompanying height of the base cutter during the delay was maintained at a height within the acceptable height bandwidth, better crop productivity was able to be achieved.

It should be understood and appreciated that the pressure limit, the desired cutting height, and the upper and lower height level values as denoted on FIGS. 6A and 7A and 7B need not be the same from operation to operation, but may be depended upon various conditions and designs. The values utilized in such figures are illustrative only. In many instances, such parameters may be selectively set of established by an operator such as through the user interface portion 102 of processor unit 100 prior to initiation of the program control discussed hereinabove.

FIG. 8 provides in tabular form comparisons of various performance attributes associated with three particular sets of comparable harvesting cuts, wherein each set includes performance data associated with a harvesting cut made utilizing a preferred embodiment of the invention for automated control of the chassis height system and other performance data associated with a like harvesting cut made relying upon manual control of the chassis height adjustment system. As can be observed, for each of the three of cuts, the automated technique of the present invention resulted in the issuance of fewer adjustment commands and operation of the base cutter unit at a lower average pressure. For each of the sets, significantly fewer roots resulted with the automated technique of the present invention, and damage to the crop stools was significantly less. In addition, for each of the sets, the mineral impurities found by the sugar mill were less for the automated technique of the present invention than for manually controlled operations.

FIGS. 6A and 6B, 7A and 7B, and 8 clearly indicate how the preferred embodiment of the present invention operates to achieve a more productive harvest cut while minimizing wear and tear on the equipment by automatedly monitoring both cutting resistance encountered and the height of the base cutter unit and controlling the position of the base cutter unit in response to such monitored parameters.

From all that has been said, it will be clear that there has been shown an improved system and method for controlling and adjusting the height of a harvesting implement of a harvesting machine during a harvesting operation without the necessity for continuous user intervention and that such system and method realize the objects and advantages sought therefor. It will be apparent to those skilled in the art, however, that many changes, modifications, variations, and other uses and applications which do not depart from the spirit and scope of the invention are deemed to be covered by the invention, which is limited only by the claims which follow.

What is claimed is:

1. A control system for automatically controlling the vertical positioning during a harvesting operation of a base cutter unit of a harvesting machine that includes a chassis supported above the ground by mobile support members and a chassis height adjustment system operable to vertically adjust the height of the chassis relative to the ground surface, the chassis having a base cutter unit operatively connected thereto and an associated ground track system operable to detect irregularities in the ground surface and to produce base cutter height position signals representative of the height of the base cutter unit above the detected ground surface, the base cutter unit including a controllable cutting apparatus, the cutting apparatus having associated therewith a pressure sensing system operable to detect resistance at the cutting apparatus and to produce cutting resistance signals, the control system comprising a processor unit having a user interface portion for the entry of data and control information by an operator, a monitor input portion operatively connected to receive base cutter height position signals and cutting resistance signals, and a controller output portion operatively connected to control the operation of the chassis height adjustment system, the chassis height adjustment system being responsive to height adjustment control signals at said controller output portion to vertically adjust the height of the chassis relative to the ground surface, said processor unit operable under program control, upon initiation thereof by an operator, following entry of desired chassis height data by the operator and the positioning of the chassis to the desired height with the base cutter unit positioned at a nominal position to define a desired cutting height, to thereafter simultaneously monitor and respond to cutting resistance signals and to base cutter height position signals to automatically adjust the height of the chassis and the associated base cutter unit as the harvesting machine traverses the ground in effecting a harvesting cut, said processor unit operating under program control to perform in a test cycle the steps of (a) determining whether, at the time of test, the cutting resistance signal is indicative of a resistance below an established upper limit pressure value and,
   (i) if not, applying at said controller output portion a height adjustment signal to effect an upward adjustment in the height of the chassis relative to the ground surface and re-initiating such test cycle; or
   (ii) if so, continuing to step (b);

(b) determining whether, at the time of test, the base cutter height position signal is indicative of a condition in which the base cutter height is at a position within a height bandwidth between predetermined upper and lower bandwidth level limits, and,
   (i) if not, applying at said controller output portion a height adjustment signal to effect an adjustment in the height of the chassis relative to the ground surface and re-initiating such test cycle; or
   (ii) if so, re-initiating such test cycle;

whereby the position of the cutting apparatus is automatedly and continuously adjusted to cut at approximately the desired cutting height during the course of the harvesting cut operation without the need for operator intervention.

2. The control system of claim 1 wherein step (b) comprises the steps of (b1) determining whether, at the time of test, the base cutter height position signal is indicative of a condition in which the base cutter height is at a position within the height bandwidth below the upper bandwidth level limit, and,
   (i) if not, applying at said controller output portion a signal to effect an downward adjustment in the height of the chassis relative to the ground surface and re-initiating such test cycle; or
   (ii) if so, continuing to step (b2);

(b2) determining whether, at the time of test, the base cutter height signal is indicative of a condition in which the base cutter height is at a position within the height bandwidth above the lower bandwidth level limit, and,
   (i) if not, applying at said controller output portion a signal to effect an upward adjustment in the height of the chassis relative to the ground surface and re-initiating such test cycle; or
   (ii) if so, re-initiating such test cycle.

3. A sugar cane harvester comprising
a chassis;
mobile support members supporting said chassis;
a chassis height adjustment system associated with said chassis and said mobile support members;
a base cutter unit associated with and connected to said chassis, said base cutter unit including a controllable cutting apparatus and an associated pressure sensing system operable to detect encountered resistance to cutting and to produce cutting resistance signals;
a ground track system operable to detect irregularities in the ground surface and to produce base cutter height position signals representative of the height of the base cutter unit above the detected ground surface; and
a control system for automatedly controlling the vertical positioning during a harvesting operation of said base cutter unit to maintain said base cutter unit at approximately a desired cutting height during the course of a harvesting cut operation;

said control system comprising
  a processor unit including
    a user interface portion for the entry of data and control information by an operator,
    a monitor input portion operatively connected to receive said base cutter height position signals and said cutting resistance signals, and
    a controller output portion operatively connected to control the operation of said chassis height adjustment system;

said chassis height adjustment system being responsive to height adjustment signals provided at said controller output portion of said processor unit to vertically adjust the height of said chassis relative to the ground surface;

said processor unit operable under program control, upon initiation thereof by an operator, following entry of desired chassis height data by the operator and the positioning of said chassis to the desired height with said base cutter positioned at a nominal position to define a desired cutting height, to thereafter simultaneously monitor and respond to cutting resistance signals and to base cutter height position signals to automatically adjust the height of said chassis and its associated base cutter unit as the sugar cane harvester traverses the ground in effecting the harvesting cut;

said processor unit operating under program control to perform in a test cycle the steps of (a) determining whether, at the time of test, the cutting resistance signal is indicative of a resistance below an established upper limit pressure value and,
   (i) if not, applying at said controller output portion a height adjustment signal to effect an upward adjustment in the height of the chassis relative to the ground surface and re-initiating such test cycle; or
   (ii) if so, continuing to step (b);

(b) determining whether, at the time of test, the base cutter height position signal is indicative of a condition in which the base cutter height is at a position within a height bandwidth between predetermined upper and lower bandwidth level limits, and,
   (i) if not, applying at said controller output portion a height adjustment signal to effect an adjustment in the height of the chassis relative to the ground surface and re-initiating such cycle; or
   (ii) if so, re-initiating such test cycle.

4. The sugar cane harvester of claim 3 wherein, in performing step (b), said processor unit operates under program control to perform the steps (b1) determining whether, at the time of test, the base cutter height position signal is indicative of a condition in which the base cutter height is at a position within the height bandwidth below the upper bandwidth level limit, and,
   (i) if not, applying at said controller output portion a signal to effect a downward adjustment in the height of the chassis relative to the ground surface and re-initiating such test cycle; or
   (ii) if so, continuing to step (b2);

(b2) determining whether, at the time of test, the base cutter height signal is indicative of a condition in which the base cutter height is at a position within the height bandwidth above the lower bandwidth level limit, and, (i) if not, applying at said controller output portion a signal to effect an upward adjustment in the height of the chassis relative to the ground surface and re-initiating such test cycle; or (ii) if so, re-initiating such test cycle.

5. The sugar cane harvester of claim 3 wherein said chassis height adjustment system includes a hydraulic elevation system for effecting the vertical adjustment of the chassis relative to the ground.

6. The sugar cane harvester of claim 5 wherein said hydraulic elevation system includes a double action hydraulic piston operatively connected to a mobile support member and to said chassis, a hydraulic pump, a control valve installed between said hydraulic pump and said double action hydraulic piston to control the flow of hydraulic fluid therebetween, and a solenoid control unit operatively connected to said control valve and actuatable in response to height adjustment control signals to effect the vertical adjustment of the chassis relative to the ground surface.

7. The sugar cane harvester of claim 3 wherein said cutting apparatus includes a rotary disc cutter, a hydraulic motor, and a hydraulic pump, the hydraulic pump being operable to provide hydraulic fluid under pressure to drive the hydraulic motor to effect a cutting operation by the rotary disc cutter, the fluid pressure required for effecting a cutting operation being a function of the resistance in cutting encountered by said hydraulic motor, and wherein said pressure sensing system includes a pressure transducer positioned to monitor the pressure of the hydraulic fluid.

8. The sugar cane harvester of claim 3 wherein said ground track system includes a first displacement follower portion operable to detect the vertical position of a first portion of said chassis at a point in time and to produce a first portion signal representative thereof, and a position calculation sensor portion operatively connected to said first displacement follower portion and operable to produce a base cutter height position signal based at least in part upon said first portion signal.

9. The sugar cane harvester of claim 8 wherein said ground track system also includes a second displacement follower portion and a displacement converter portion, said second displacement portion operable to detect the vertical position of a second portion of said chassis at a point in time and to produce a second portion signal representative thereof, each of said displacement follower portions being associated with a respective side of said chassis and producing displacement follower signals representative of the position of said chassis on such respective side, said displacement converter portion operatively connected to receive said first and second portion signals and to provide to said position calculation sensor portion a composite signal based at least in part upon said first and second portion signals, said base cutter height position signal produced by said position calculation sensor portion corresponding to said composite signal produced by said displacement converter portion.

10. The sugar cane harvester of claim 9 wherein said position sensor calculation portion includes a linear position transmitter.

11. The sugar cane harvester of claim 3 wherein said processor unit includes a programmable microprocessor.

12. The sugar cane harvester of claim 11 wherein said programmable microprocessor is programmed to effect the cyclical performance of steps (a) and (b).

13. The sugar cane harvester of claim 3 wherein said processor unit includes a logic array having components interconnected to sequentially perform steps (a) and (b).

14. The sugar cane harvester of claim 3 wherein said processor unit includes a mechanical stepper mechanism connected to sequence through the performance of steps (a) and (b).

15. A method of automatedly controlling the vertical positioning during a harvesting operation of a base cutter unit of a harvesting machine that includes a chassis supported above the ground by mobile support members and a chassis height adjustment system operable to vertically adjust the height of the chassis relative to the ground surface, the chassis having a base cutter unit operatively connected thereto and an associated ground track system operable to detect irregularities in the ground surface and to produce base cutter height position signals representative of the height of the base cutter unit above the detected ground surface, the base cutter unit including a controllable cutting apparatus, the cutting apparatus having associated therewith a pressure sensing system operable to detect resistance at the cutting apparatus and to produce cutting resistance signals, the method comprising providing a control system including a processor unit having a user interface portion for the entry of data and control information by a user, a monitor input portion operatively connected to receive base cutter height position signals and cutting resistance signals, and a controller output portion operatively connected to the chassis height adjustment system to control the operation thereof such that the chassis height adjustment system is responsive to height adjustment control signals at said controller output portion to vertically adjust the height of the chassis relative to the ground surface, said processor unit operable under program control, upon initiation thereof by an operator, following entry of desired chassis height data by the operator and the positioning of the chassis to the desired height with the base cutter unit positioned at a nominal position to define a desired cutting height, to thereafter simultaneously monitor and respond to cutting resistance signals and to base cutter height position signals to automatically adjust the height of the chassis and the associated base cutter unit as the harvesting machine traverses the ground in effecting a harvesting cut by performing in a test cycle the steps of (a) determining whether, at the time of test, the cutting resistance signal is indicative of a resistance below an established upper limit pressure value and, (i) if not, applying at said controller output portion a height adjustment signal to effect an upward adjustment in the height of the chassis relative to the ground surface and re-initiating such test cycle; or (ii) if so, continuing to step (b);

(b) determining whether, at the time of test, the base cutter height position signal is indicative of a condition in which the base cutter height is at a position within a height bandwidth between predetermined upper and lower bandwidth level limits, and, (i) if not, applying at said controller output portion a height adjustment signal to effect an adjustment in the height of the chassis relative to the ground surface and re-initiating such test cycle; or (ii) if so, re-initiating such test cycle;

establishing a desired upper pressure limit for the pressure sensing system, a desired working height for the base cutter unit and upper and lower height level limits therefor; and initiating operation of the processor unit under program control;

whereby the processor unit thereafter operates under program control to automatically adjust the height of the chassis and the associated base cutter unit as the harvesting machine traverses the ground in effecting a harvesting cut.

16. The method of claim 15 wherein, in performing step (b), the processor unit operates to
  (b1) determine whether, at the time of test, the base cutter height position signal is indicative of a condition in which the base cutter height is at a position within the height bandwidth below the upper bandwidth level limit, and,
    (i) if not, to apply at said controller output portion a signal to effect an downward adjustment in the height of the chassis relative to the ground surface and to re-initiate such test cycle; or
    (ii) if so, to continue to step (b2);
  (b2) determine whether, at the time of test, the base cutter height signal is indicative of a condition in which the base cutter height is at a position within the height bandwidth above the lower bandwidth level limit, and,
    (i) if not, to apply at said controller output portion a signal to effect an upward adjustment in the height of the chassis relative to the ground surface and to re-initiate such test cycle; or
    (ii) if so, to re-initiate such test cycle.

17. A method of re-configuring a sugar cane harvester to include automated control of the vertical positioning during a harvesting operation of a base cutter unit of the sugar cane harvester wherein the sugar cane harvester includes a chassis, mobile support members supporting the chassis, a chassis height adjustment system associated with the chassis and the mobile support members, a base cutter unit associated with and connected to the chassis, the base cutter unit including a controllable cutting apparatus and an associated pressure sensing system operable to detect encountered resistance to cutting and to produce cutting resistance signals, a ground track system operable to detect irregularities in the ground surface and to produce base cutter height position signals representative of the height of the base cutter unit above the detected ground surface, and a control system comprising a processor unit including a user interface portion for the entry of data and control information by an operator, a monitor input portion having input connections to which signals can be operatively provided, and a controller output portion operatively connected to control the operation of the chassis height adjustment system, the chassis height adjustment system being responsive to height adjustment signals provided at the controller output portion of said processor unit to vertically adjust the height of said chassis relative to the ground surface,
  the method comprising
  ensuring that the input connections of the monitor input portion of the processor unit are operatively connected to receive the base cutter height position signals and the cutting pressure signals;
  programming the processor unit to operate under program control upon initiation thereof by an operator, following entry of desired chassis height data by the operator and the positioning of the chassis to the desired height with the base cutter unit positioned at a nominal position to define a desired cutting height, to thereafter simultaneously monitor and respond to cutting resistance signals and to base cutter height position signals to automatically adjust the height of the chassis and the associated base cutter unit as the harvesting machine traverses the ground in effecting a harvesting cut, such programming including the test cycle steps of
    (a) determining whether, at the time of test, the cutting resistance signal is indicative of a resistance below an established upper limit pressure value and,
      (i) if not, applying at said controller output portion a height adjustment signal to effect an upward adjustment in the height of the chassis relative to the ground surface and re-initiating such test cycle; or
      (ii) if so, continuing to step (b);
    (b) determining whether, at the time of test, the base cutter height position signal is indicative of a condition in which the base cutter height is at a position within a height bandwidth between predetermined upper and lower bandwidth level limits, and,
      (i) if not, applying at said controller output portion a height adjustment signal to effect an adjustment in the height of the chassis relative to the ground surface and re-initiating such test cycle; or
      (ii) if so, re-initiating such test cycle;
  whereby the re-configured sugar cane harvester can operate under program control to automatedly and continuously adjust height of the base cutter unit to cut at approximately the desired cutting height during the course of the harvesting cut operation without the need for operator intervention.

18. The method of claim 17 wherein programming step (b) includes the steps of
  (b1) determining whether, at the time of test, the base cutter height position signal is indicative of a condition in which the base cutter height is at a position within the height bandwidth below the upper bandwidth level limit, and,
    (i) if not, applying at said controller output portion a signal to effect an downward adjustment in the height of the chassis relative to the ground surface and re-initiating such test cycle; or
    (ii) if so, continuing to step (b2);
  (b2) determining whether, at the time of test, the base cutter height signal is indicative of a condition in which the base cutter height is at a position within the height bandwidth above the lower bandwidth level limit, and,
    (i) if not, applying at said controller output portion a signal to effect an upward adjustment in the height of the chassis relative to the ground surface and re-initiating such test cycle; or
    (ii) if so, re-initiating such test cycle.

19. The method of claim 17 wherein the processor unit includes a programmable microprocessor having associated memory and wherein the programming of the processor unit includes entering and storing a program including program steps (a) and (b) into the memory associated with the microprocessor.

20. The method of claim 17 wherein the processor unit includes a logic array having components interconnectable with one another to define a sequence of operations and wherein the programming of the processor unit includes interconnecting components of the logical array to define the sequential performance of steps (a) and (b).

21. The method of claim 17 wherein the processor unit includes a mechanical stepper mechanism connectable to control a sequence of operations and wherein the programming of the processor unit includes connecting the mechanical stepper mechanism to effect the sequential performance of steps (a) and (b).

* * * * *